(12) United States Patent
Sunada et al.

(10) Patent No.: US 10,275,100 B2
(45) Date of Patent: Apr. 30, 2019

(54) OPTICALLY TRANSPARENT CONDUCTIVE MATERIAL

(71) Applicant: MITSUBISHI PAPER MILLS LIMITED, Sumida-ku, Tokyo (JP)

(72) Inventors: Kazuhiko Sunada, Sumida-ku (JP); Yasuhiro Tanaka, Sumida-ku (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 0 days.

(21) Appl. No.: 15/319,853

(22) PCT Filed: Jun. 17, 2015

(86) PCT No.: PCT/JP2015/067441
§ 371 (c)(1),
(2) Date: Dec. 19, 2016

(87) PCT Pub. No.: WO2015/198937
PCT Pub. Date: Dec. 30, 2015

(65) Prior Publication Data
US 2017/0139504 A1 May 18, 2017

(30) Foreign Application Priority Data

Jun. 25, 2014 (JP) .................................. 2014-130470

(51) Int. Cl.
*G06F 3/044* (2006.01)
(52) U.S. Cl.
CPC .... *G06F 3/044* (2013.01); *G06F 2203/04112* (2013.01)
(58) Field of Classification Search
CPC .................. G06F 3/044; G06F 2203/04112
(Continued)

(56) References Cited

U.S. PATENT DOCUMENTS

| 2012/0031746 A1 | 2/2012 | Hwang et al. |
| 2013/0028503 A1 | 1/2013 | Wakui et al. |

(Continued)

FOREIGN PATENT DOCUMENTS

| JP | 2011-216377 | 10/2011 |
| JP | 2012-533877 | 12/2012 |

(Continued)

OTHER PUBLICATIONS

Mathematical Model of Territories—Introduction to Mathematical Engineering through Voronoi diagrams (published by Kyoritsu Shuppan in Feb. 2009).

*Primary Examiner* — Mark W Regn
(74) *Attorney, Agent, or Firm* — Venable LLP

(57) ABSTRACT

Provided is an optically transparent conductive material which does not cause moire or grain even when placed over a liquid crystal display, that is, has a favorably low visibility (moire and grain are less recognizable), and has a high reliability. The optically transparent conductive material has, on an optically transparent base material, an optically transparent conductive layer having sensor parts and dummy parts, the sensor parts and/or the dummy parts being formed of a metal mesh pattern consisting of Voronoi edges formed based on a plurality of generators arranged in a plane tiled using polygons longer in the first direction than in the second direction, the mesh pattern being characterized in that each polygon has only one generator arranged in the polygon and that the generator is at an arbitrary position within a reduced polygon formed by connecting points at 90% or less of the direct distance from the center of gravity of the polygon to each vertex of the polygon.

6 Claims, 7 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2013/0215067 A1 | 8/2013 | Hwang et al. | |
| 2013/0341079 A1* | 12/2013 | Hwang | G02B 5/1866 174/268 |
| 2014/0055380 A1 | 2/2014 | Han et al. | |
| 2014/0111711 A1* | 4/2014 | Iwami | B32B 7/02 349/12 |

FOREIGN PATENT DOCUMENTS

| | | |
|---|---|---|
| JP | 2013-037683 | 2/2013 |
| JP | 2013-540331 | 10/2013 |
| JP | 2014-026510 | 2/2014 |
| JP | 2014-041589 | 3/2014 |
| JP | 2014-048791 | 3/2014 |

* cited by examiner (a)

(b)

(a)

(b)

OPTICALLY TRANSPARENT CONDUCTIVE MATERIAL

This application is a national phase of PCT Application No. PCT/JP2015/067441 filed Jun. 17, 2015, which in turn claims benefit of Japanese Patent Application No. 2014-130470 filed Jun 25, 2014.

TECHNICAL FIELD

The present invention relates to an optically transparent conductive material mainly used for touchscreens and, in particular, to an optically transparent conductive material preferably used for optically transparent electrodes of projected capacitive touchscreens.

BACKGROUND ART

In electronic devices, such as personal digital assistants (PDAs), laptop computers, office automation equipment, medical equipment, and car navigation systems, touchscreens are widely used as their display screens that also serve as input means.

There are a variety of touchscreens that utilize different position detection technologies, such as optical, ultrasonic, surface capacitive, projected capacitive, and resistive technologies. A resistive touchscreen has a configuration in which an optically transparent conductive material and a glass plate with an optically transparent conductive layer are separated by spacers and face each other so as to function as a touchsensor formed of an optically transparent electrode. A current is applied to the optically transparent conductive material and the voltage of the glass plate with an optically transparent conductive layer is measured. In contrast, a capacitive touchscreen has a basic configuration in which an optically transparent electrode that functions as a touchsensor is formed of an optically transparent conductive material having an optically transparent conductive layer provided on a base material. Having no movable parts, a capacitive touchscreen has high durability. With such high durability and high transmission rate, capacitive touchscreens are used in various applications. Further, touchscreens utilizing projected capacitive technology allow simultaneous multipoint detection, and therefore are widely used for smartphones, tablet PCs, etc.

Generally, as an optically transparent conductive material used for optically transparent electrodes of touchscreens, those having an optically transparent conductive layer made of an ITO (indium tin oxide) film formed on a base material have been used. However, there has been a problem of low optical transparency due to high refractive index and high surface light reflectivity of ITO conductive films. Another problem is that ITO conductive films have low flexibility and thus are prone to crack when bent, resulting in increased electric resistance of the optically transparent conductive material.

A known optically transparent conductive material having an optically transparent conductive layer as an alternative to the ITO conductive film is an optically transparent conductive material having, as an optically transparent conductive layer, a mesh pattern of a metal thin line on an optically transparent base material, in which pattern, for example, the line width, pitch, pattern shape, etc. are appropriately adjusted. This technology provides an optically transparent conductive material which maintains a high light transmission rate and which has a high conductivity. Regarding the mesh pattern formed of metal thin lines (hereinafter referred to as metal mesh pattern), it is known that a repetition unit of any shape can be used. For example, in JP 10-41682 A, a triangle, such as an equilateral triangle, an isosceles triangle, and a right triangle; a quadrangle, such as a square, a rectangle, a rhombus, a parallelogram, and a trapezoid; a (regular) n-sided polygon, such as a (regular) hexagon, a (regular) octagon, a (regular) dodecagon, and a (regular) icosagon; a circle; an ellipse; and a star, and a combinational pattern of two or more thereof are disclosed.

As a method for producing the above-mentioned optically transparent conductive material, a semi-additive method for forming a metal mesh film, the method comprising making a thin catalyst layer on a base material, making a resist pattern on the catalyst layer, making a laminated metal layer in an opening of the resist by plating, and finally removing the resist layer and the base metal protected by the resist layer, is disclosed in, for example, JP 2007-284994 A and JP 2007-287953 A.

Also, in recent years, a method in which a silver halide diffusion transfer process is employed using a silver halide photosensitive material as a precursor to a conductive material is known. For example, JP 2003-77350 A, JP 2005-250169 A, and JP 2007-188655 A disclose a technology for forming a metal (silver) pattern by a reaction of a silver halide photosensitive material (a conductive material precursor) having at least a physical development nuclei layer and a silver halide emulsion layer in this order on a base material with a soluble silver halide forming agent and a reducing agent in an alkaline fluid. This method can reproduce a metal pattern of a uniform line width. In addition, due to the highest conductivity of silver among all metals, a thinner line with a higher conductivity can be achieved as compared with other methods. An additional advantage is that a layer having a metal pattern obtained by this method has a higher flexibility, i.e. a longer flexing life as compared with an ITO conductive film.

When an optically transparent conductive material having such a metal pattern as described above is placed over a liquid crystal display, the cycle of the metal pattern and the cycle of the liquid crystal display element interfere with each other, causing a problem of moire. Liquid crystal displays have elements of various dimensions depending on the screen size and the resolution, which further complicates the problem.

As a solution to this problem, in Patent Literature 1, Patent Literature 2, Patent Literature 3, and Patent Literature 4, a method in which the interference is suppressed by the use of a traditional random diagram described in, for example, Non Patent Literature 1 is suggested. In Patent Literature 5, an electrode base material for touchscreens, in which a plurality of unit pattern areas having a random metal pattern are arranged is introduced.

CITATION LIST

Patent Literature

Patent Literature 1: JP 2011-216377 A
Patent Literature 2: JP 2013-37683 A
Patent Literature 3: JP 2014-41589 A
Patent Literature 4: JP 2013-540331 T
Patent Literature 5: JP 2014-26510 A Non Patent Literature Non Patent Literature 1: *Mathematical Models of Territories—Introduction to Mathematical Engineering through Voronoi diagrams*—(published by Kyoritsu Shuppan in February, 2009)

SUMMARY OF INVENTION

Technical Problem

Since the above metal pattern using a random diagram does not have any cycle of repetition of a simple unit graphic and therefore theoretically does not interfere with the cycle of the liquid crystal display element, moire does not occur. However, in the metal pattern using a random diagram, a part where the distribution of the metal thin line is sparse and a part where the distribution is dense randomly appear and are visibly recognized, causing a problem of "grain". As a means to solve this problem, an optically transparent conductive material which has a favorably low visibility of the metal pattern (the grain is less easily recognizable) has been demanded.

In an optically transparent electrode of a projected capacitive touchscreen, a plurality of sensor parts each extending in a specific direction are electrically connected with a terminal part via a wire part. Between every two of the plurality of sensor parts, a dummy part having line breaks is arranged to prevent electrical connection between the sensor parts. Due to the presence of such dummy parts, a favorably lowered visibility of the sensor parts (visual inconspicuousness of the sensor parts) is achieved. Regarding the outline shape of the sensor parts of the optically transparent electrode, generally known is the "diamond pattern", in which the outline shape of each sensor part is partially narrowed at a certain cycle. When two optically transparent electrodes using the diamond pattern are placed in a layered manner, the overlap between the sensor parts of one electrode and the sensor parts of the other electrode is reduced in a planar view. In such a pattern, the width of the narrowed part of the sensor part is designed so narrow as to be almost the same as the line interval of the metal mesh pattern. In such a case, use of a metal pattern of which the line width is thin causes a problem of reliability, e.g., variation of resistance values and occurrence of line breaks when the metal pattern is exposed to high-temperature and high-pressure conditions in the processing, for example. This problem is particularly obvious in optically transparent conductive materials having the above-mentioned random metal pattern, and therefore means for the improvement have been required.

An object of the present invention is to provide an optically transparent conductive material which does not cause moire or grain even when placed over a liquid crystal display, that is, has a favorably low visibility (moire and grain are less recognizable), and has a high reliability.

Solution to Problem

The above object will be basically achieved by the optically transparent conductive material described below.

(1) An optically transparent conductive material having, on an optically transparent base material, an optically transparent conductive layer having sensor parts electrically connected to terminal parts, and dummy parts not electrically connected to the terminal parts, the optically transparent conductive layer being formed of the sensor parts each extending in a first direction, the sensor parts being arranged at an arbitrary cycle in a second direction perpendicular to the first direction in such a manner that each of the dummy parts is sandwiched between every two of the sensor parts, the sensor parts and/or the dummy parts being formed of a metal mesh pattern consisting of Voronoi edges formed based on a plurality of generators arranged in a plane tiled using polygons longer in the first direction than in the second direction, the mesh pattern being characterized in that each polygon has only one generator arranged in the polygon and that the generator is at an arbitrary position within a reduced polygon formed by connecting points at 90% or less of the direct distance from the center of gravity of the polygon to each vertex of the polygon.

(2) The optically transparent conductive material of the above (1), wherein the ratio of the length of the polygon in the first direction and the length of the polygon in the second direction is 1.1:1 to 10:1.

(3) The optically transparent conductive material of the above (1), wherein the ratio of the length of the polygon in the first direction and the length of the polygon in the second direction is 1.1:1 to 5:1.

(4) The optically transparent conductive material of any one of the above (1) to (3), wherein the sensor parts each extending in the first direction have an outline shape partially narrowed at a certain cycle, and the number of the polygons arranged in the second direction in a portion at which the width of the sensor part in the second direction is narrowest is five or more.

Advantageous Effects of Invention

The present invention can provide an optically transparent conductive material which has a favorably low visibility of moire and grain even when placed over a liquid crystal display and which has a high reliability.

DESCRIPTION OF EMBODIMENTS

Hereinafter, the present invention will be illustrated in detail with reference to drawings, but it is needless to say that the present invention is not limited to the embodiments described below and various alterations and modifications may be made without departing from the technical scope of the invention.

Figure 1:
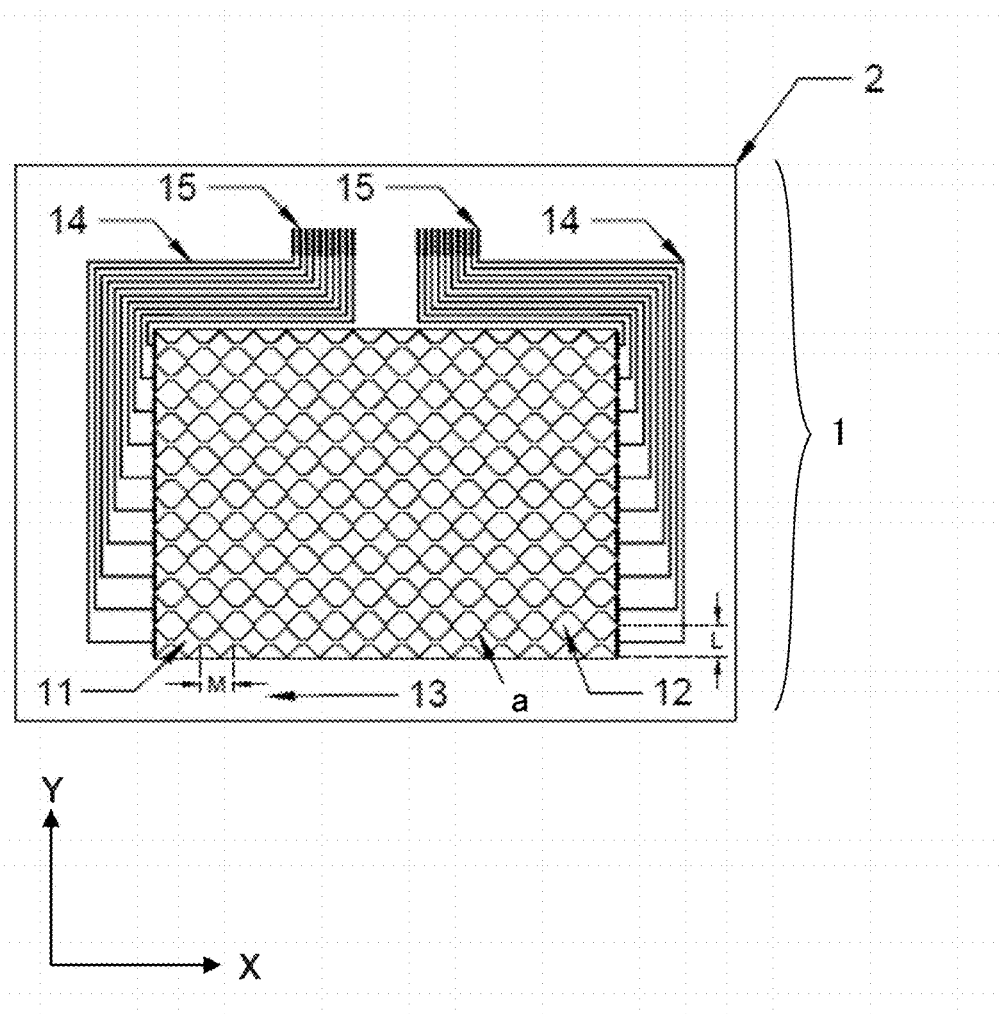
FIG. 1 is a schematic view showing an example of the optically transparent conductive material of the present invention.

FIG. 1 is a schematic view showing an example of the optically transparent conductive material of the present invention. In FIG. 1, an optically transparent conductive material 1 has, on at least one side of an optically transparent base material 2, a sensor part 11 formed of a metal pattern, a dummy part 12, a peripheral wire part 14, a terminal part 15, and a non-image part 13 not having any metal pattern.

The sensor part 11 and the dummy part 12 are each formed of metal thin lines in a mesh shape, but in FIG. 1, the mesh shape is not shown and the areas of the sensor part 11 and the dummy part 12 are conveniently shown by outline a. The sensor part 11 is electrically connected, via the peripheral wire part 14, to the terminal part 15. By electrically connecting the terminal part 15 to the outside, changes in capacitance detected by the sensor part 11 can be captured. In the present invention, the sensor part 11 may be electrically connected by direct contact with the terminal part 15, but is preferably electrically connected with the terminal part 15 via the peripheral wire part 14 as shown in FIG. 1 for assemblage of multiple terminal parts 15 on a location near the edge of the conductive material. Meanwhile, metal patterns not electrically connected to the terminal part 15 all serve as the dummy parts 12 in the present invention. In the present invention, the peripheral wire part 14 and the terminal part 15 need not particularly have optical transparency, and therefore may either be a solid pattern (a pattern without optical transparency) or a metal pattern of a mesh shape.

In FIG. 1, the sensor parts 11 of the optically transparent conductive material 1 are column electrodes extending in the first direction (x direction), and a plurality of columns of the sensor parts 11 and the dummy parts 12 are arranged in the second direction (y direction) perpendicular to the first direction in such a manner that each dummy part is sandwiched between every two sensor parts, in the plane of the optically transparent conductive layer. Also, the columns of the sensor parts 11 are arranged at a certain cycle L in the second direction (y direction). The cycle of the sensor parts 11 may be set at any length in the range within which the resolution as a touch sensor is maintained. The width of the sensor part 11 may be constant, but preferably the sensor part has a pattern cycle in the first direction (x direction) as shown in FIG. 1. FIG. 1 shows an example in which the sensor part 11 is narrowed at a cycle of M (an example of a diamond pattern). The width of the sensor part 11 (the width of the unnarrowed portions in the diamond pattern) may also be set at any value in the range within which the resolution as a touch sensor is maintained, and accordingly the shape and the width of the dummy part 12 may also be freely set.

In the present invention, the sensor part 11 and/or the dummy part 12 is formed of a metal pattern having a mesh shape. Hereinafter, the mesh shape of the optically transparent conductive material of the present invention will be described.

Figure 2:
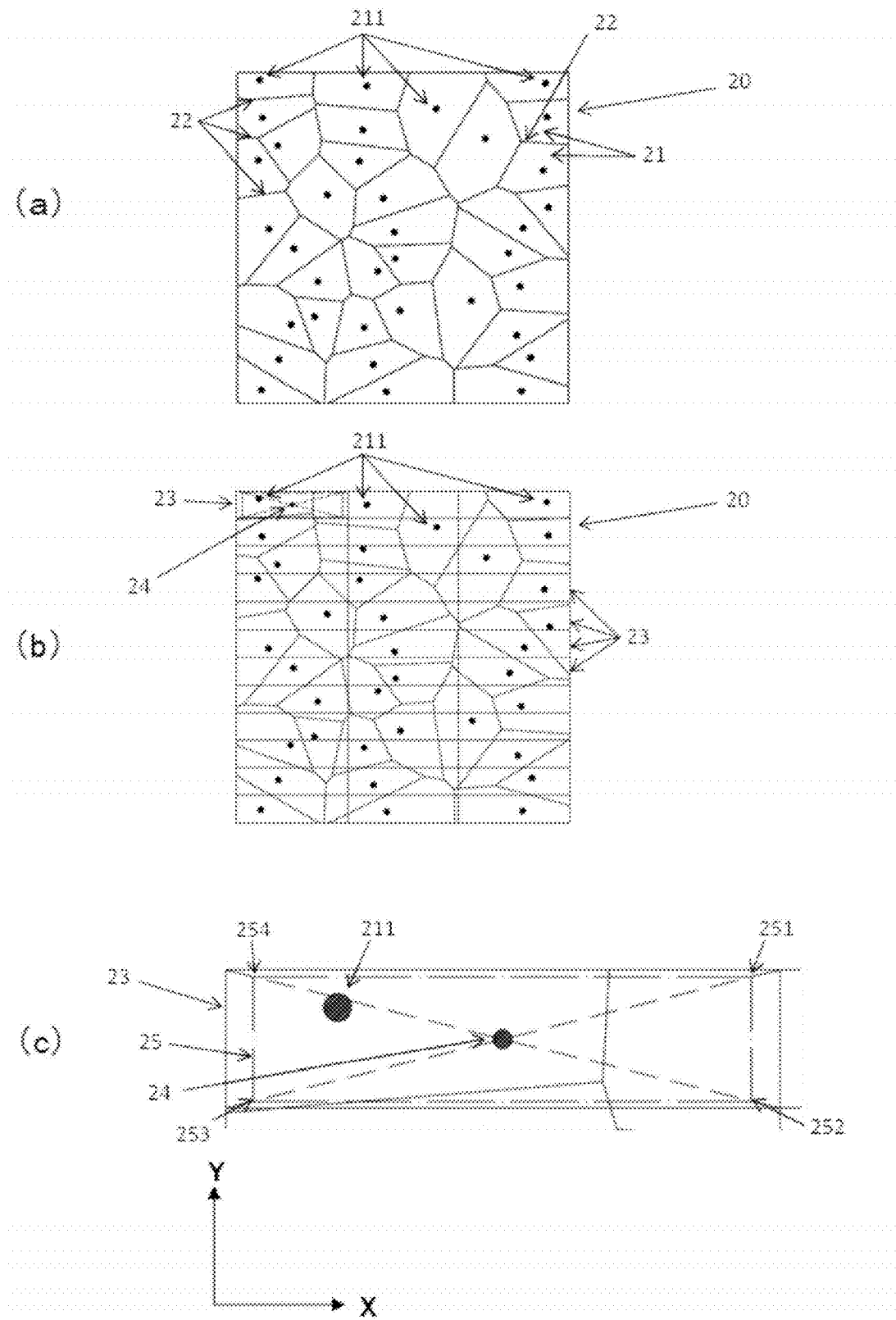
FIGS. 2(a)-(c) illustrate a Voronoi diagram.

The shape of the metal pattern of the sensor part 11 and/or the dummy part 12 is a mesh shape composed of Voronoi edges (hereinafter, referred to as a Voronoi diagram). The term "a mesh shape composed of Voronoi edges" means that the mesh shape is formed of Voronoi edges. The Voronoi diagram is a publicly known diagram applied in various fields including the field of information processing. FIG. 2 is used to illustrate the diagram. FIG. 2 illustrates a Voronoi diagram. In FIG. 2a, generators 211 are arranged on a plane 20. The plane 20 is divided by boundary lines 22, which are straight lines, in such a manner that a region 21 closest to a generator 211 is separated from other regions 21 each closest to a different generator 211. The boundary lines 22 each between two different regions 21 are called Voronoi edges. A Voronoi edge is a part of the perpendicular bisector of the line segment connecting a generator to an adjacent generator. The diagram formed of the Voronoi edges (a diagram in which the region of each generator is shown by Voronoi edges) is called a Voronoi diagram.

FIG. 2b shows a method for arranging generators, which method is preferably used in the present invention. The plane 20 is tiled using 36 (=3×12) quadrangles 23 without any space therebetween, and in each quadrangle 23, one generator 211 is arranged. The quadrangle 23 is a rectangle longer in the first direction (x direction) than in the second direction (y direction) of the optically transparent conductive layer.

Figure 3:
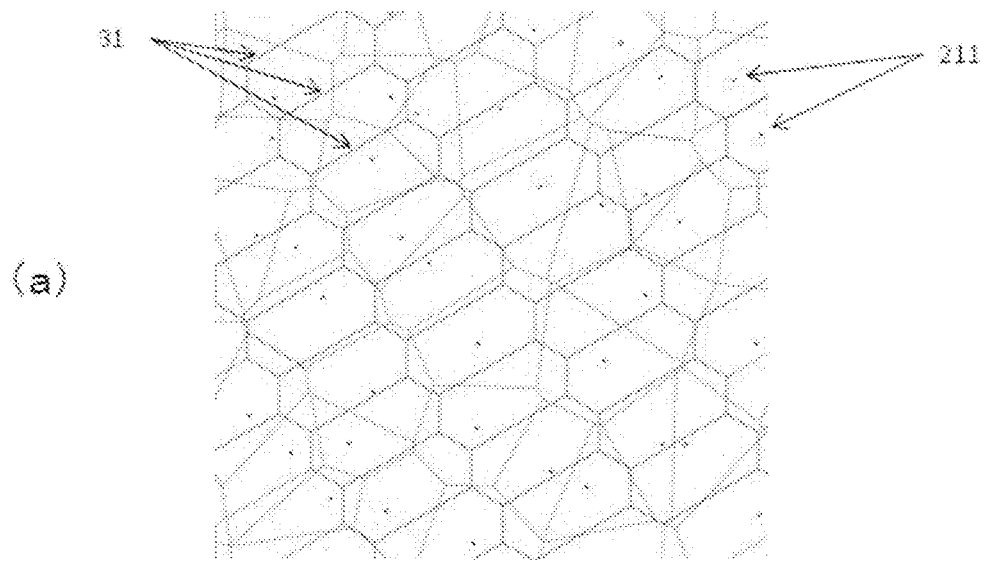
FIGS. 3(a)-(b) illustrate polygons tiling a plane.
Figure 3:
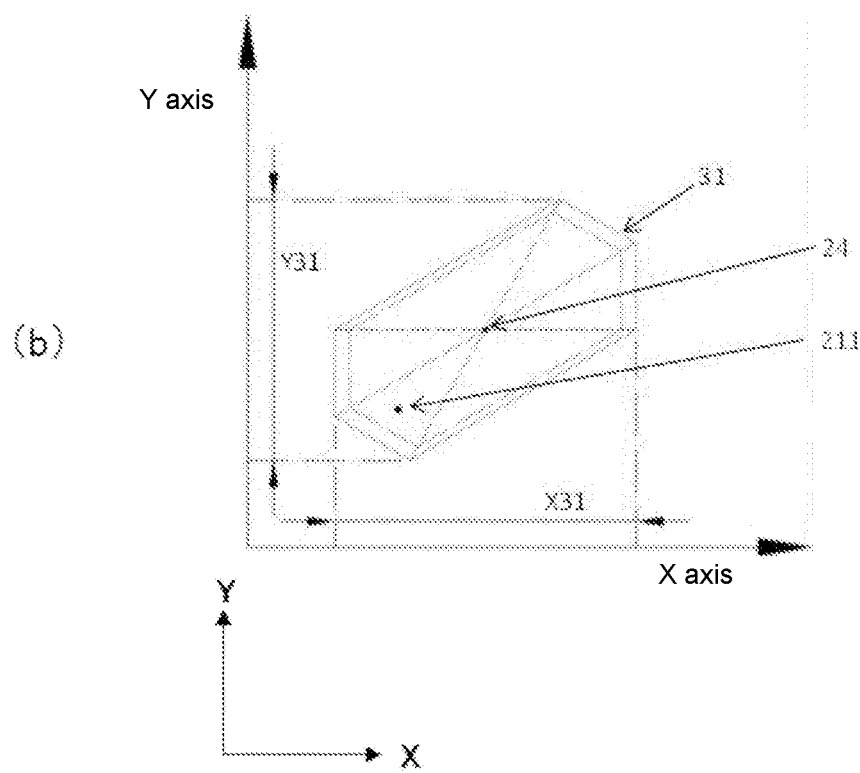

FIG. 3 illustrates polygons tiling a plane, and FIG. 3a is an example in which a plane is tiled using hexagons 31 without any space therebetween. FIG. 3b shows the length of the hexagon 31 in the first direction (x direction) and the length in the second direction (y direction). In the present invention, when the x axis is set in the first direction (x direction) and the y axis is set in the second direction (y direction), the length of the line segment obtained by the projection of a polygon onto the x axis is referred to as the "length of the polygon in the first direction (x direction)" and the length of the line segment obtained by the projection of the polygon onto the y axis is referred to as the "length of the polygon in the second direction (y direction)". In FIG. 3b, the length of the hexagon 31 in the first direction (x direction) is X31 and the length in the second direction (y direction) is Y31. The hexagon 31 has a shape longer in the first direction (x direction) than in the second direction (y direction) of the optically transparent conductive layer.

In the present invention, the polygon is not limited to a quadrangle or a hexagon, and a triangle may also be used. Further, two or more kinds of polygons or polygons of different sizes may be used. When two or more kinds of polygons or polygons of different sizes are used, it is enough that 50% or more (in the number) of the polygons have shapes longer in the first direction (x direction) than in the second direction (y direction). The shapes of the polygons are preferably of a single kind. Also, the polygons are preferably of a single size.

As described above, in a diagram formed by tiling of a plane using polygons longer in the first direction than in the second direction, each polygon has one generator arranged in the polygon. The location of the generator will be illustrated referring to FIG. 2b or FIG. 2c, which is an enlarged view of FIG. 2b. In the present invention, the generator 211 is located at an arbitrary position within a reduced quadrangle 25 as a reduced polygon formed by connecting points 251, 252, 253, and 254 on straight lines connecting the center of gravity 24 of the polygon and each vertex of the polygon, the points being located at 90% or less of the distance from the center of gravity 24 to each vertex. In FIG. 2c, a reduced polygon formed by connecting points at 90% of the distance from the center of gravity of the polygon to each of the vertices is shown. However, in the present invention, a reduced polygon formed by connecting points at 90% or less of the distance from the center of gravity of the polygon to each of the vertices may be selected. In the reduced polygon, the reduction percentages of the distances from the center of gravity to the vertices are preferably all the same, but may differ from each other. When the distances from the center of gravity to each of the vertices of the reduced polygon are short, moire tends to occur. Therefore, a reduced polygon formed by connecting points on straight lines connecting the center of gravity of the polygon and each vertex of the polygon, the points being at 50 to 80% of the distance from the center of gravity to each vertex of the polygon, is preferably selected.

Figure 4:
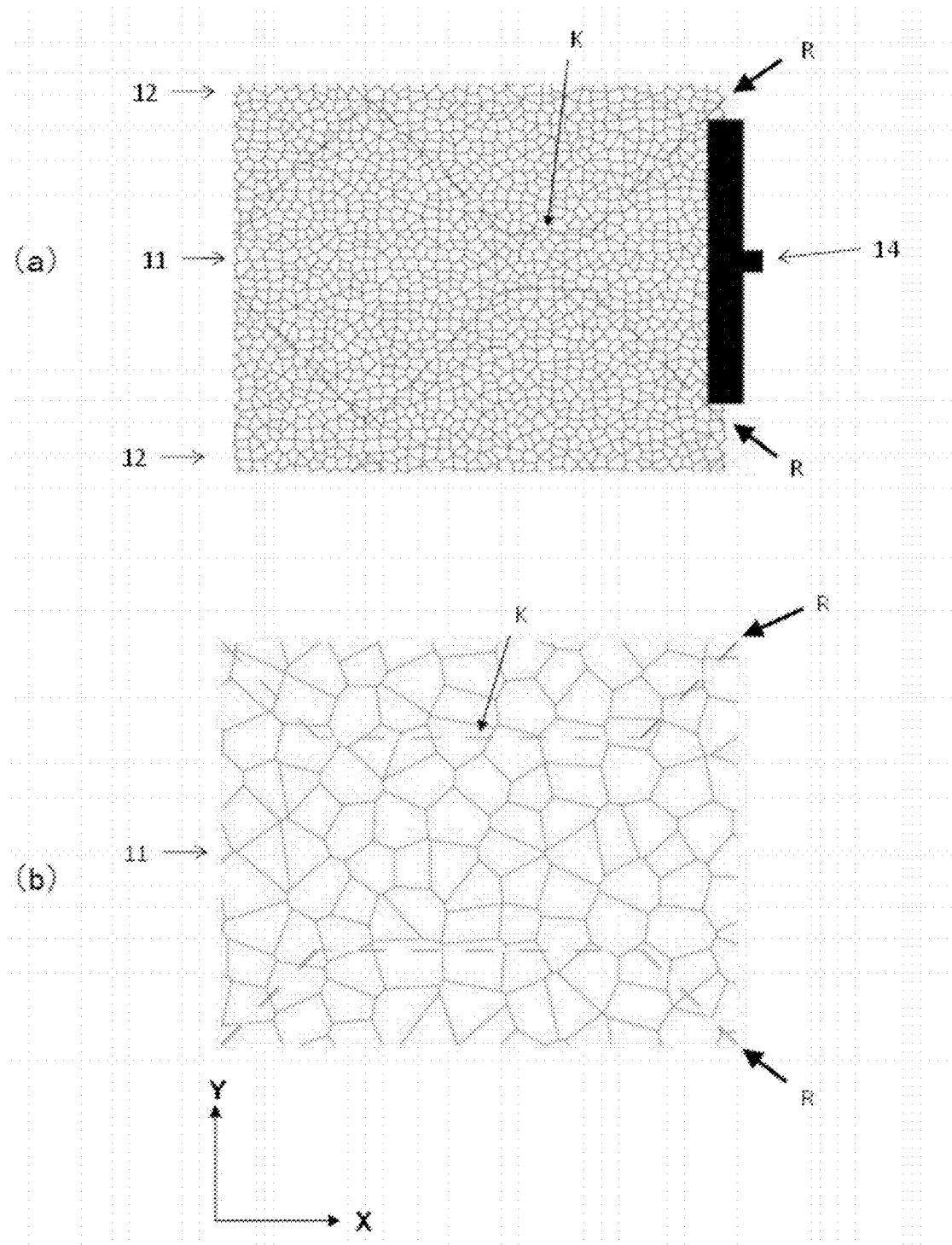
FIGS. 4(a)-(b) schematically illustrate arrangement of polygons tiling a plane.
Figure 5:
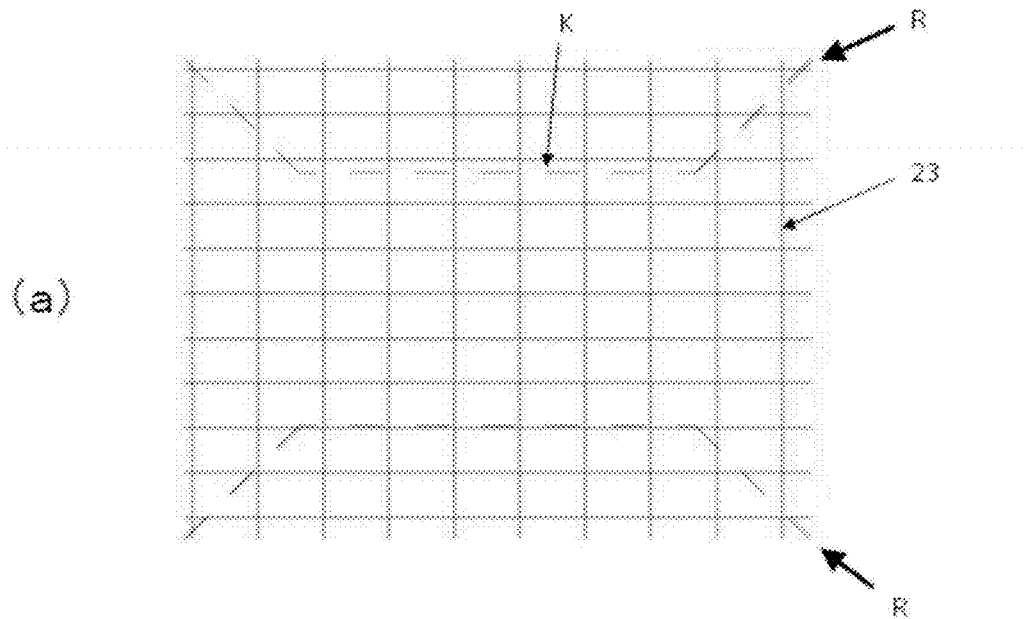
FIGS. 5(a)-(b) schematically illustrate arrangement of polygons tiling a plane.
Figure 5:
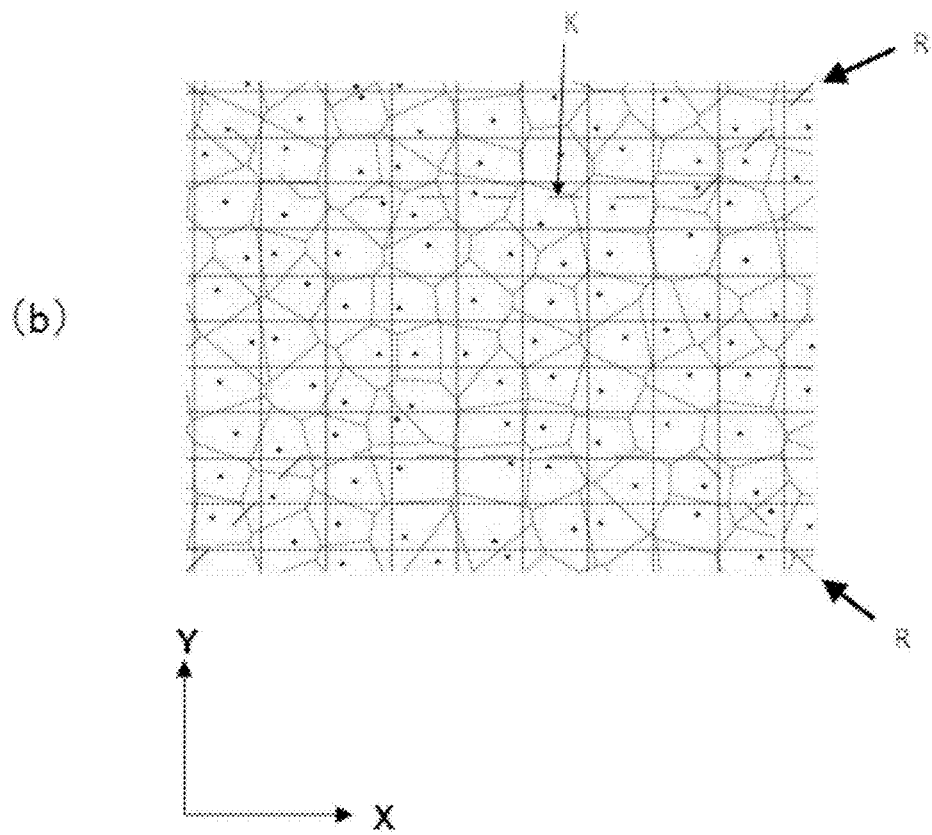

In the present invention, the polygon which is used in the tiling of a plane to determine the locations of generators has a shape longer in the first direction, i.e., in the direction in which the sensor part extends. As a result, the Voronoi edges tend to be oriented in the direction of the sensor part. Of the polygon used in the tiling, the ratio of the length in the first direction and the length in the second direction is preferably 1.1:1 to 10:1, and more preferably 1.1:1 to 5:1. Preferably, in the present invention, five or more of the polygons are arranged in the second direction in a portion at which the sensor part is shortest in the second direction (y direction), i.e., at which the width is narrowest. FIG. 4 and FIG. 5 illustrate arrangement of polygons tiling a plane. In FIG. 4a, the sensor part 11 is a column electrode extending in the first direction (x direction), and the boundaries with the dummy parts 12 are shown by imaginary boundary lines R (nonexistent lines). In FIG. 4a, the sensor part 11 is shortest (narrowest) in the second direction (y direction) in the portion K. FIG. 4b is an enlarged view of the portion K, and FIG. 5a and FIG. 5b also show the same portion K. FIG. 5a shows a state in which 5.7 polygons are arranged in the y direction in the portion K, and FIG. 5b shows Voronoi diagram formation by arranging, according to the present invention, generators in the polygons of FIG. 5a. It is preferable that five or more polygons, in which generators are to be arranged, align in a portion at which the sensor part is narrowest in the second direction (y direction) as described above, because in that case reliability can be maintained despite the irregularity of the metal pattern (for example, even if a line break occurs, the sensor part still works as an electrode). The length of the shortest side of the polygon in which a generator is to be arranged is preferably 100 to 2000 µm, and more preferably 120 to 800 µm.

As already described in the description of FIG. 1, there is no electrical connection between the sensor part and the dummy part. In FIG. 4a, the metal pattern of the sensor part 11 and the dummy part 12 is formed of a Voronoi diagram, and the sensor part 11 is electrically connected to the peripheral wire part 14. As described above, in FIG. 4a, an imaginary boundary line R is shown on the boundary between the sensor part 11 and the dummy part 12, and on the imaginary boundary line R, line breaks are provided. The length of the line break is preferably 3 to 100 µm, and more preferably 5 to 20 µm. In FIG. 4a, line breaks are provided only at positions along the imaginary boundary line R, but any number of additional line breaks may be provided at any locations in the dummy part 12.

Figure 6:
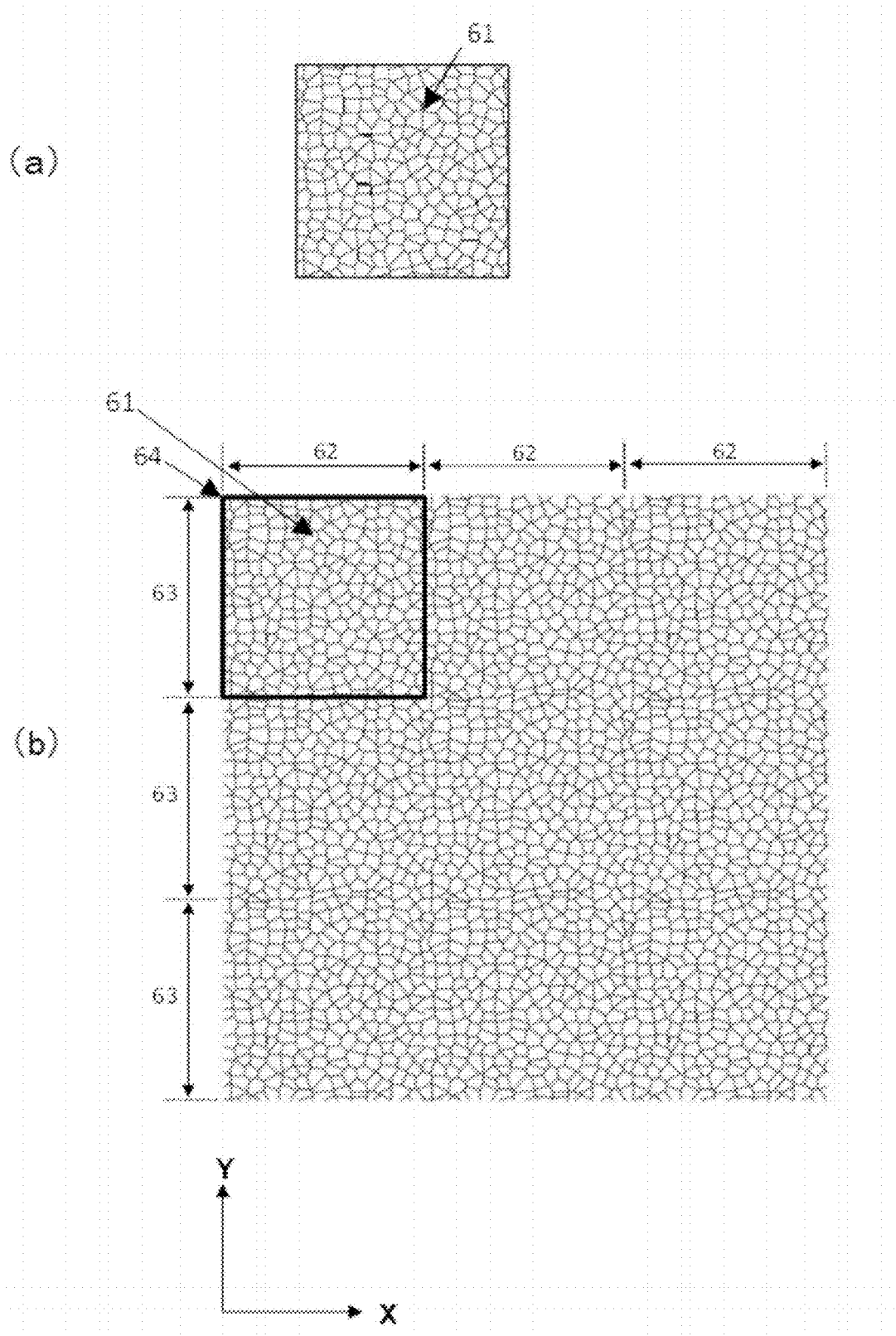
FIGS. 6(a)-(b) schematically illustrate a unit pattern area.

In the present invention, the sensor part 11 and/or the dummy part 12 may be formed by the repetition of a unit pattern area in the optically transparent conductive layer, and the unit pattern area may be formed of, for example, a Voronoi diagram generated based on the generators in the reduced quadrangles in the 36 quadrangles tiling a plane as described above. FIG. 6 schematically illustrates the unit pattern area. FIG. 6a is an example of a unit pattern area having a mesh pattern. FIG. 6b is an example of the repetition of a unit pattern area 61 having a mesh pattern. In FIG. 6b, the mesh pattern of the unit pattern area 61 does not have any cycle within the unit pattern area enclosed by the quadrangle 64. This unit pattern area 61 (having the length 62 in the x direction and the length 63 in the y direction) is repeated at a repetition cycle 62 in the x direction and at a repetition cycle 63 in the y direction to form a large continuous metal pattern. In the cases where the unit pattern area formed of a Voronoi diagram is repeated in this way, metal thin lines on the boundary between two unit pattern areas adjacent to each other may not connect, which may result in disconnection, in particular, in the sensor part 11. To avoid such line breaks, the positions of the metal thin lines on the quadrangle 64 of the unit pattern area 61 are preferably adjusted as appropriate for connection of the metal thin lines in the adjacent unit pattern areas.

In FIG. 6b, the unit pattern area 61 enclosed by the quadrangle 64 is repeated in two directions, i.e., in the x direction and in the y direction, in the plane of the optically transparent conductive layer to form a large continuous metal pattern. However, the outline shape of the unit pattern area 61 is, as long as tiling of a plane can be achieved with use thereof, not particularly limited, and the examples thereof include triangles, such as an equilateral triangle, an isosceles triangle, and a right triangle; quadrangles, such as a square, a rectangle, a rhombus, a parallelogram, and a trapezoid; an equilateral hexagon; a combination of two or more of these and other shapes, etc. Regarding the direction of the repetition, at least two directions in the plane of the optically transparent conductive layer can be selected depending on the outline shape of the unit pattern area.

In the present invention, the metal pattern constituting the sensor part 11 and the dummy part 12 (in some cases the peripheral wire part 14, the terminal part 15, etc. as well) preferably comprises a metal, and the metal is preferably gold, silver, copper, nickel, aluminum, or a composite material thereof. As the method for forming the metal patterns, publicly known methods can be used, and the examples thereof include a method in which a silver halide photosensitive material is used; a method in which, after a silver image is obtained by the aforementioned method, electroless plating or electrolytic plating of the silver image is performed; a method in which screen printing with use of a conductive ink, such as a silver paste and a copper paste, is performed; a method in which inkjet printing with use of a conductive ink, such as a silver ink and a copper ink, is performed; a method in which the metal pattern is obtained by forming a conductive layer by evaporation coating or sputtering, forming a resist film thereon, exposing, developing, etching, and removing the resist layer; and a method in which the metal pattern is obtained by placing a metal foil, such as a copper foil, making a resist film thereon, exposing, developing, etching, and removing the resist layer. Among them, the silver halide diffusion transfer process is preferred for easily forming an extremely microscopic metal pattern and for producing for allowing reduction in the thickness of the metal pattern. If the metal pattern produced by any of the above-mentioned procedures is too thick, the subsequent processes (for example, adhesion to another base material) may become difficult to carry out, and if the metal pattern is too thin, the conductivity required of touchscreens can hardly be achieved. Therefore, the thickness is preferably 0.01 to 5 µm, and more preferably 0.05 to 1 µm. The line width of the Voronoi diagram (Voronoi edges) of the sensor parts 11 and the dummy parts 12 is preferably 1 to 20 µm, and more preferably 2 to 7 µm. The total light transmittance of the sensor parts 11 and the total light transmittance of the dummy parts 12 is preferably 80% or higher, and more preferably 85% or higher. Preferred is that the difference in the total light transmittance between the sensor parts 11 and the dummy parts 12 is within ±0.1%, and more preferred is that the total light transmittance of the sensor parts 11 is equal to that of the dummy parts 12. The sensor parts 11 and the dummy parts 12 each preferably have a haze value of 2 or less. The b* values (an index of perceivable colors in the yellow direction, specified in JIS Z8730) of the sensor parts 11 and the dummy parts 12 are preferably 2.0 or less, and more preferably 1.0 or less.

As the optically transparent base material of the optically transparent conductive material, a publicly known sheet which has optical transparency and which is made of, for example, glass, a polyester resin such as polyethylene terephthalate (PET) or polyethylene naphthalate (PEN), an acrylate resin, an epoxy resin, a fluororesin, a silicone resin, a polycarbonate resin, a diacetate resin, a triacetate resin, a polyarylate resin, polyvinyl chloride, a polysulfone resin, a polyether sulfone resin, a polyimide resin, a polyamide resin, a polyolefine resin, a cyclic polyolefin resin, or the like is preferably used. Here, "optically transparent" means that the total light transmittance is 60% or higher. The thickness of the optically transparent base material is preferably 50 µm to 5 mm. Also, the optically transparent base material may be provided with a publicly known layer, such as an anti-fingerprint layer, a hard coat layer, an antireflection layer, and an antiglare layer.

The optically transparent conductive material of the present invention may be provided with, in addition to the optically transparent conductive layer described above, a publicly known layer, such as a hard coat layer, an antireflection layer, an adhesive layer, and an antiglare layer at any location. Also, between the optically transparent base material and the optically transparent conductive layer, a publicly known layer, such as a physical development nuclei layer, an easily adhering layer, and an adhesive layer may be provided.

EXAMPLES

Hereinafter, the present invention will be illustrated in more detail by Examples, but the present invention is not limited thereto and can be embodied in various ways within the scope of the invention.
<Optically Transparent Conductive Material 1>

As an optically transparent base material, a 100-µm-thick polyethylene terephthalate film was used. The total light transmittance of this optically transparent base material was 91%.

Next, in accordance with the following formulation, a physical development nuclei coating liquid was prepared, applied onto the optically transparent base material, and dried to provide a physical development nuclei layer on the optically transparent base material.
<Preparation of Palladium Sulfide Sol>

| Liquid A | Palladium chloride | 5 g |
| | Hydrochloric acid | 40 mL |
| | Distilled water | 1000 mL |
| Liquid B | Sodium sulfide | 8.6 g |
| | Distilled water | 1000 mL |

Liquid A and Liquid B were mixed with stirring, and after 30 minutes, passed through a column filled up with an ion exchange resin to give a palladium sulfide sol.
<Preparation of Physical Development Nuclei Coating Liquid>per m² of Silver Halide Photosensitive Material

| The above-prepared palladium sulfide sol | 0.4 mg |
| 2 mass % glyoxal aqueous solution | 0.2 mL |
| Surfactant (S-1) | 4 mg |
| Denacol EX-830 | 50 mg |
| (Polyethylene glycol diglycidyl ether made by Nagase Chemtex Corp.) | |
| 10 mass % SP-200 aqueous solution | 0.5 mg |
| (Polyethyleneimine made by Nippon Shokubai Co., Ltd.; average molecular weight: 10,000) | |

Subsequently, an intermediate layer, a silver halide emulsion layer, and a protective layer, of which the compositions are shown below, were applied in this order (from closest to the optically transparent base material) onto the above physical development nuclei layer, and dried to give a silver halide photosensitive material. The silver halide emulsion was produced by a general double jet mixing method for photographic silver halide emulsions. The silver halide emulsion was prepared using 95 mol % of silver chloride and 5 mol % of silver bromide so as to have an average particle diameter of 0.15 µm. The obtained silver halide emulsion was subjected to gold and sulfur sensitization using sodium thiosulfate and chloroauric acid by the usual method. The silver halide emulsion obtained in this way contained 0.5 g of gelatin per gram of silver.
<Composition of Intermediate Layer/m²>

| Gelatin | 0.5 g |
| Surfactant (S-1) | 5 mg |
| Dye 1 | 50 mg |

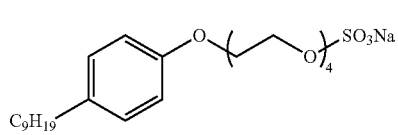

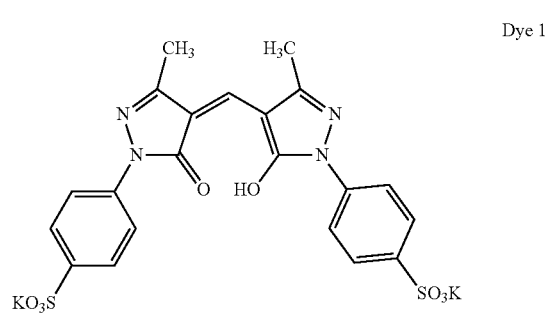

<Composition of Silver Halide Emulsion Layer/m²>

| Gelatin | 0.5 g |
| Silver halide emulsion | Equivalent of 3.0 g of silver |
| 1-Phenyl-5-mercaptotetrazole | 3 mg |
| Surfactant (S-1) | 20 mg |

<Composition of Protective Layer/m²>

| Gelatin | 1 g |
| Amorphous silica matting agent (average particle diameter: 3.5 µm) | 10 mg |
| Surfactant (S-1) | 10 mg |

Figure 7:
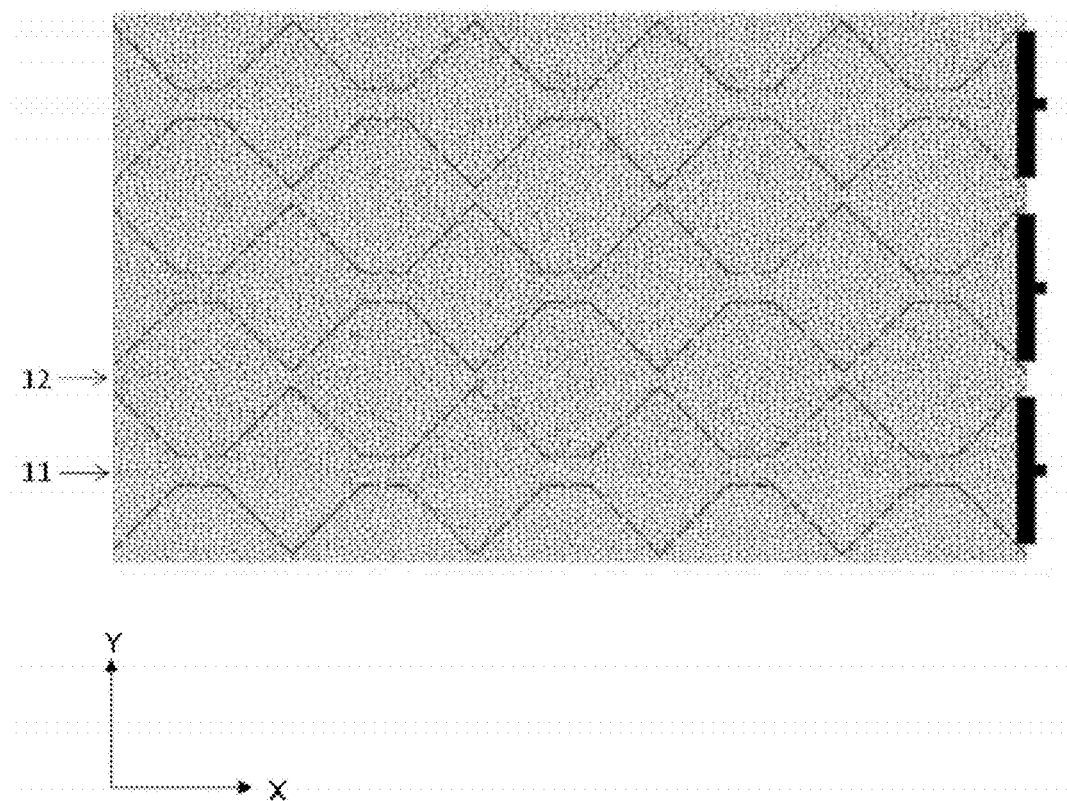
FIG. 7 is an enlarged view showing the manuscript used in the Examples.

The silver halide photosensitive material obtained as above was brought into close contact with a transparent manuscript having the pattern image shown in FIG. 1, and exposure was performed, through a resin filter which cuts off light of 400 nm or less, using a contact printer having a mercury lamp as a light source. FIG. 7 is an enlarged view showing a part of the transparent manuscript (where imaginary boundary lines are also shown). Of the sensor part 11, the narrowest width in the y direction was 0.8 mm. To generate the Voronoi diagram of the sensor part 11 and the dummy part 12 shown in FIG. 7, tiling was performed by alignment using rectangles of which the length of the x-direction side was 0.6 mm and the length of the y-direction side was 0.15 mm in the x and y directions, and in each of reduced rectangles (80% of the original rectangles) obtained by connecting points located at 80% of the distance from the center of gravity of the rectangle to each vertex, a generator was randomly arranged. In the sensor part 11, the number of the rectangles aligned in the narrowest part in the y direction was 5.3. The line width of the Voronoi edges was 4 µm. Thin lines on the boundary between the sensor parts and the dummy parts were provided with line breaks 20 µm in length. The total light transmittance of the sensor parts was 89.5%, and the total light transmittance of the dummy parts was 89.5%.

After immersion in the diffusion transfer developer shown below at 20° C. for 60 seconds, the silver halide emulsion layer, the intermediate layer, and the protective layer were washed off with warm water at 40° C., and a drying process was performed. In this way, the optically transparent conductive material 1 having a metal silver image of the pattern of FIG. 1 as an optically transparent conductive layer was obtained. The metal silver image of the optically transparent conductive layer of the obtained optically transparent conductive material had the exactly same shape and line width as those of the transparent manuscript having the pattern shown in FIG. 1 and FIG. 7. The film thickness of the metal silver image measured with a confocal microscope was 0.1 µm.

<Composition of Diffusion Transfer Developer>

| | |
|---|---:|
| Potassium hydroxide | 25 g |
| Hydroquinone | 18 g |
| 1-Phenyl-3-pyrazolidone | 2 g |
| Potassium sulfite | 80 g |
| N-methylethanolamine | 15 g |
| Potassium bromide | 1.2 g |

Water was added to the above ingredients to make the total volume of 1000 mL, and the pH was adjusted to 12.2.

<Optically Transparent Conductive Material 2>

The transparent conductive material 2 was obtained in the same manner as in the preparation of the optically transparent conductive material 1 except for using a transparent manuscript as described below. The transparent manuscript had the pattern shown in FIG. 1, but in the generation of the Voronoi diagram, tiling was performed using rectangles of which the length of the x-direction side was 0.333 mm and the length of the y-direction side was 0.27 mm, and then, in each of the 80%-sized reduced rectangles thereof, a generator was randomly arranged. In the sensor part 11, the number of the rectangles aligned in the narrowest part in the y direction was 2.96. The line width of the Voronoi edges, the length of line breaks, and the total light transmittance were the same as those of the optically transparent conductive material 1.

<Optically Transparent Conductive Material 3>

The transparent conductive material 3 was obtained in the same manner as in the preparation of the optically transparent conductive material 1 except for using a transparent manuscript as described below. The transparent manuscript had the pattern shown in FIG. 1, but in the generation of the Voronoi diagram, tiling was performed using squares of which the length of one side was 0.3 mm, and then, in each of the 80%-sized reduced squares thereof, a generator was randomly arranged. In the sensor part 11, the number of the squares aligned in the narrowest part in the y direction was 2.67. The line width of the Voronoi edges, the length of line breaks, and the total light transmittance were the same as those of the optically transparent conductive material 1.

<Optically Transparent Conductive Material 4>

The transparent conductive material 4 was obtained in the same manner as in the preparation of the optically transparent conductive material 1 except for using a transparent manuscript as described below. The transparent manuscript had the pattern shown in FIG. 1, but in the generation of the Voronoi diagram, tiling was performed using rectangles of which the length of the x-direction side was 0.9 mm and the length of the y-direction side was 0.1 mm, and then, in each of the 80%-sized reduced rectangles thereof, a generator was randomly arranged. In the sensor part 11, the number of the rectangles aligned in the narrowest part in the y direction was 8. The line width of the Voronoi edges, the length of line breaks, and the total light transmittance were the same as those of the optically transparent conductive material 1.

<Optically Transparent Conductive Material 5>

The transparent conductive material 5 was obtained in the same manner as in the preparation of the optically transparent conductive material 1 except for using a transparent manuscript as described below. The transparent manuscript had the pattern shown in FIG. 1, but in the generation of the Voronoi diagram, tiling was performed using rectangles of which the length of the x-direction side was 0.9 mm and the length of the y-direction side was 0.1 mm, and then, in each of the 90%-sized reduced rectangles thereof (rectangles obtained by connecting points located at 90% of the distance from the center of gravity of the rectangle to each vertex), a generator was randomly arranged. In the sensor part 11, the number of the rectangles aligned in the narrowest part in the y direction was 8. The line width of the Voronoi edges, the length of line breaks, and the total light transmittance were the same as those of the optically transparent conductive material 1.

<Optically Transparent Conductive Material 6>

The transparent conductive material 6 was obtained in the same manner as in the preparation of the optically transparent conductive material 1 except for using a transparent manuscript which has the pattern of FIG. 1 but has a mesh pattern formed by repetition of a rhombic unit graphic having a 500-µm diagonal in the x-direction and a 260-µm diagonal in the y-direction instead of a Voronoi diagram. In the sensor part 11, the number of the rhombuses aligned in the narrowest part in the y direction was 3.08. The line width of the pattern was 4 µm, and the total light transmittance of the sensor parts and the dummy parts was 89.3%.

The obtained optically transparent conductive materials 1 to 6 were evaluated in terms of the visibility and the stability of resistance (reliability). The results are shown in Table 1. The obtained optically transparent conductive material was placed on the screen of a 23" wide LCD monitor (Flatron23EN43V-B2 made by LG Electronics) displaying solid white, and the visibility was evaluated based on the following criteria. The level at which moire or grain was obvious was defined as "C", the level at which moire or grain was noticeable as a result of close inspection was defined as "B", and the level at which moire or grain was unnoticeable was defined as "A". For the evaluation of the stability of resistance, each optically transparent conductive material was left in the environment of a temperature of 85° C. and a relative humidity of 95% for 600 hours, then the continuity between all the pairs of terminal parts 15 in FIG.

1 supposed to be electrically connected with each other was checked, and the disconnection rate was determined.

TABLE 1

|  | Visibility | Disconnection rate | Note |
|---|---|---|---|
| Optically transparent conductive material 1 | A | 0% | Present invention |
| Optically transparent conductive material 2 | A | 5% | Present invention |
| Optically transparent conductive material 3 | A | 40% | Comparative Example |
| Optically transparent conductive material 4 | B | 5% | Present invention |
| Optically transparent conductive material 5 | B | 8% | Present invention |
| Optically transparent conductive material 6 | C | 10% | Comparative Example |

The results in Table 1 show that the present invention provides an optically transparent conductive material which does not produce moire even when placed over a liquid crystal display, has favorably low visibility, and is excellent in the stability of electrical resistance values (reliability), and therefore is suitable as an optically transparent electrode for capacitive touchscreens.

REFERENCE SIGNS LIST

1 Optically transparent conductive material
2 Optically transparent base material
11 Sensor part
12 Dummy part
13 Non-image part
14 Peripheral wire part
15 Terminal part
20 Plane
21 Region
22 Boundary line of region
23 Quadrangle
24 Center of gravity of quadrangle
25 Reduced quadrangle
61 Unit pattern area
62, 63 Repetition cycle
211 Generator
251, 252, 253, 254 Point located at 90% of the distance from the center of gravity to vertex
R Imaginary boundary line

The invention claimed is:

1. A method for forming a pattern of an optically transparent conductive material comprising an optically transparent base material bearing an optically transparent conductive layer having sensor parts electrically connected to terminal parts, and dummy parts not electrically connected to the terminal parts,
the optically transparent conductive layer being formed of the sensor parts each extending in a first direction, the sensor parts being arranged at an arbitrary cycle in a second direction perpendicular to the first direction in such a manner that each of the dummy parts is sandwiched between every two of the sensor parts, the method comprising:
forming the sensor parts and/or the dummy parts of a metal pattern having a mesh shape, the mesh shape being formed by Voronoi edges, wherein
the Voronoi edges are formed based on generators arranged by tiling a plane using polygons longer in the first direction than in the second direction, and
further arranging the generator at an arbitrary position within a reduced polygon formed by connecting points at 90% or less of the direct distance from the center of gravity of the polygon to each vertex of the polygon.

2. The method for forming the pattern of the optically transparent conductive material of claim 1, wherein the ratio of the length of the polygon in the first direction and the length of the polygon in the second direction is 1.1:1 to 10:1.

3. The method for forming the pattern of the optically transparent conductive material of claim 2, wherein the sensor parts each extending in the first direction have an outline shape partially narrowed at a certain cycle, and the number of the polygons arranged in the second direction in a portion at which the width of the sensor part in the second direction is narrowest is five or more.

4. The method for forming the pattern of the optically transparent conductive material of claim 1, wherein the ratio of the length of the polygon in the first direction and the length of the polygon in the second direction is 1.1:1 to 5:1.

5. The method for forming the pattern of the optically transparent conductive material of claim 4, wherein the sensor parts each extending in the first direction have an outline shape partially narrowed at a certain cycle, and the number of the polygons arranged in the second direction in a portion at which the width of the sensor part in the second direction is narrowest is five or more.

6. The method for forming the pattern of the optically transparent conductive material of claim 1, wherein the sensor parts each extending in the first direction have an outline shape partially narrowed at a certain cycle, and the number of the polygons arranged in the second direction in a portion at which the width of the sensor part in the second direction is narrowest is five or more.

* * * * *